United States Patent

Vaccaro et al.

[15] 3,676,644

[45] July 11, 1972

[54] CODED DOCUMENT AND SYSTEM FOR AUTOMATICALLY READING SAME

[72] Inventors: Angelo Vaccaro, Port Washington; Harold F. E. Dixon, Douglaston, both of N.Y.

[73] Assignee: Columbia Controls Research Corporation, Glen Cove, N.Y.

[22] Filed: March 5, 1970

[21] Appl. No.: 16,858

[52] U.S. Cl...........235/61.11 D, 235/61.12 M, 340/146.3 Z, 340/174.1 H

[51] Int. Cl.....................G06k 7/08, G06k 19/06, G11b 5/68

[58] Field of Search...........340/174.1 H, 146.3 Z, 146.3 RR, 340/149 A; 235/61.12, 61.11 D, 61.11 E; 250/219 I

[56] References Cited

UNITED STATES PATENTS

| | | | |
|---|---|---|---|
| 3,211,470 | 10/1965 | Wilson | 283/18 |
| 3,418,456 | 12/1968 | Hamisch | 235/61.11 E |
| 3,316,392 | 4/1967 | Bailey | 235/61.12 |
| 2,977,024 | 3/1961 | Harriss | 222/2 |
| 3,445,633 | 5/1969 | Ratner | 235/61.7 B |
| 2,634,911 | 4/1953 | Wolowitz | 235/61.12 M |
| 3,502,851 | 3/1970 | Kakimoto | 235/61.11 E |
| 2,952,008 | 9/1960 | Mitchell | 235/61.11 D |
| 3,238,501 | 3/1966 | Mak | 340/146.3 |
| 3,470,358 | 9/1969 | Sallach | 235/61.11 N |

*Primary Examiner*—Maynard R. Wilbur
*Assistant Examiner*—Robert M. Kilgore
*Attorney*—Johnson & Kline

[57] ABSTRACT

A document such as a credit card formed with magnetizable indicia in the form of short and long individual bars intermingled according to a code to produce, when read by a system having a magnetic reading head, an electrical representation of the indicia to enable automatic identification of the card. The document can be passed beneath the reading head over a wide range of speeds thereby enabling the use of an inexpensive reading system. When the document is a plural layer credit card, the code is formed on an inner surface of the card to prevent erosion and alteration of the code.

11 Claims, 16 Drawing Figures

INVENTORS
Angelo Vaccaro
Harold F.E. Dixon
BY
Johnson and Kline
ATTORNEYS

Fig. 5
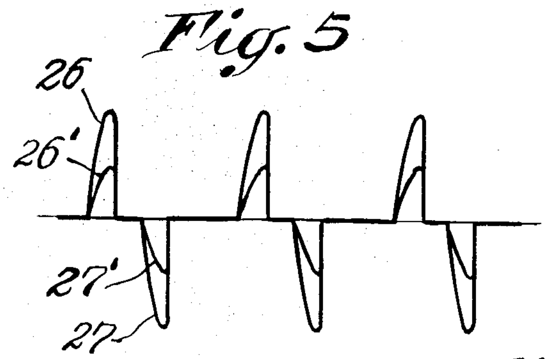
Fig. 6
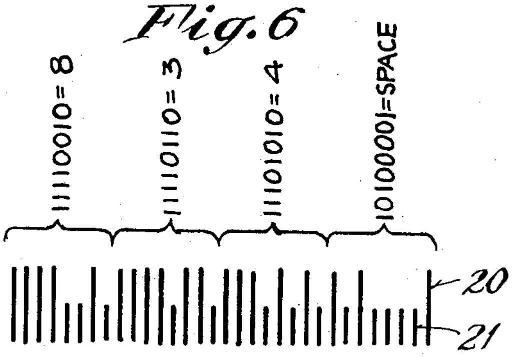
Fig. 7
| L.C. | U.C. | TRIGGER | 1 | 2 | 3 | 4 | 5 | 6 | 7 |
|---|---|---|---|---|---|---|---|---|---|
| a | A | 1 | 0 | 1 | 1 | 0 | 0 | 1 | 0 |
| b | B | 1 | 1 | 0 | 0 | 0 | 0 | 0 | 0 |
| c | C | 1 | 1 | 0 | 1 | 0 | 0 | 1 | 0 |
| d | D | 1 | 1 | 0 | 1 | 1 | 0 | 1 | 0 |
| e | E | 1 | 1 | 0 | 1 | 1 | 0 | 0 | 0 |
| f | F | 1 | 0 | 0 | 1 | 0 | 1 | 1 | 0 |
| g | G | 1 | 0 | 0 | 1 | 1 | 1 | 1 | 0 |
| h | H | 1 | 1 | 0 | 0 | 1 | 1 | 0 | 0 |
| i | I | 1 | 0 | 1 | 1 | 0 | 0 | 0 | 0 |
| j | J | 1 | 0 | 0 | 1 | 1 | 1 | 0 | 0 |
| k | K | 1 | 1 | 0 | 1 | 0 | 0 | 0 | 0 |
| l | L | 1 | 1 | 0 | 0 | 1 | 0 | 1 | 0 |
| m | M | 1 | 0 | 1 | 1 | 1 | 1 | 1 | 0 |
| n | N | 1 | 1 | 0 | 1 | 0 | 1 | 0 | 0 |
| o | O | 1 | 0 | 1 | 0 | 1 | 0 | 1 | 0 |
| p | P | 1 | 0 | 0 | 1 | 1 | 0 | 0 | 0 |
| q | Q | 1 | 0 | 0 | 1 | 0 | 0 | 0 | 0 |
| r | R | 1 | 0 | 1 | 1 | 1 | 0 | 1 | 0 |
| s | S | 1 | 0 | 1 | 0 | 1 | 0 | 0 | 0 |
| t | T | 1 | 1 | 0 | 1 | 1 | 1 | 0 | 0 |
| u | U | 1 | 1 | 0 | 1 | 0 | 1 | 1 | 0 |
| v | V | 1 | 0 | 1 | 1 | 0 | 1 | 1 | 0 |
| w | W | 1 | 0 | 1 | 0 | 0 | 0 | 0 | 0 |
| x | X | 1 | 1 | 0 | 1 | 1 | 1 | 1 | 0 |
| y | Y | 1 | 0 | 0 | 0 | 1 | 0 | 0 | 0 |
| z | Z | 1 | 1 | 1 | 1 | 1 | 1 | 0 | 0 |
| L.C. | U.C. | TRIGGER | 1 | 2 | 3 | 4 | 5 | 6 | 7 |
|---|---|---|---|---|---|---|---|---|---|
| 1 | ± | 1 | 1 | 1 | 1 | 1 | 1 | 1 | 0 |
| 2 | @ | 1 | 1 | 1 | 1 | 0 | 1 | 0 | 0 |
| 3 | # | 1 | 1 | 1 | 1 | 0 | 1 | 1 | 0 |
| 4 | $ | 1 | 1 | 1 | 0 | 1 | 0 | 1 | 0 |
| 5 | % | 1 | 1 | 1 | 1 | 1 | 0 | 0 | 0 |
| 6 | ¢ | 1 | 1 | 1 | 1 | 0 | 0 | 0 | 0 |
| 7 | & | 1 | 1 | 1 | 1 | 1 | 0 | 1 | 0 |
| 8 | * | 1 | 1 | 1 | 1 | 0 | 0 | 1 | 0 |
| 9 | ( | 1 | 1 | 1 | 0 | 0 | 0 | 0 | 0 |
| Ø | ) | 1 | 1 | 1 | 0 | 1 | 0 | 0 | 0 |
| . | . | 1 | 0 | 1 | 1 | 0 | 1 | 0 | 0 |
| ; | : | 1 | 0 | 0 | 1 | 1 | 0 | 1 | 0 |
| - | _ | 1 | 0 | 0 | 0 | 0 | 0 | 0 | 0 |
| / | ? | 1 | 0 | 0 | 0 | 1 | 0 | 1 | 0 |
| ! | ° | 1 | 0 | 1 | 1 | 1 | 1 | 0 | 0 |
| ' | " | 1 | 0 | 1 | 1 | 1 | 0 | 0 | 0 |
| = | + | 1 | 0 | 0 | 1 | 0 | 1 | 0 | 0 |
| , | , | 1 | 0 | 0 | 1 | 0 | 0 | 1 | 0 |
| CARRIER RETURN | | 1 | 0 | 0 | 0 | 1 | 0 | 0 | 1 |
| INDEX | | 1 | 1 | 0 | 0 | 1 | 0 | 0 | 1 |
| SPACE | | 1 | 0 | 1 | 0 | 0 | 0 | 0 | 1 |
| BACK SPACE | | 1 | 0 | 0 | 1 | 0 | 0 | 0 | 1 |
| TAB | | 1 | 1 | 1 | 0 | 0 | 0 | 0 | 1 |
| 32 → UPPER CASE | | 1 | 0 | 0 | 0 | 0 | 1 | 0 | 1 |
| 31 → LOWER CASE | | 1 | 0 | 0 | 0 | 0 | 0 | 1 | 1 |
| DUAL READ | | 1 | 1 | 0 | 0 | 0 | 0 | 1 | 1 |
| SKIP | | 1 | 1 | 0 | 0 | 0 | 1 | 0 | 1 |
| STOP | | 1 | 1 | 0 | 1 | 0 | 0 | 0 | 1 |
INVENTORS
Angelo Vaccaro
Harold F.E. Dixon
BY
Johnson and Kline
ATTORNEYS INVENTORS
Angelo Vaccaro
Harold F. E. Dixon
BY
Johnson and Kline
ATTORNEYS

PATENTED JUL 11 1972

3,676,644

INVENTORS
Angelo Vaccaro
Harold F.E. Dixon
BY
Johnson and Kline
ATTORNEYS

CODED DOCUMENT AND SYSTEM FOR AUTOMATICALLY READING SAME

Presently, when extending credit to a purchaser, use is made of a credit card which is issued to the purchaser by the company granting credit. The card is generally a small rectangular piece of sheet plastic material which has imprinted thereon the name of the company and embossed thereon the purchaser's name and an identifying number assigned to the purchaser by the company.

In normal use, credit is generally automatically extended to the holder of the card for small amounts while for larger amounts a sales clerk will usually communicate with the company's credit department to ascertain if credit should be extended. In the latter instance the process involves persons and thus is time consuming and relatively expensive while in the former an assumption is made that the holder's credit has not been terminated and that the card has not been reported stolen.

In order to decrease the expense of checking the card so that it becomes economically feasible to determine if credit should be extended for each purchase irrespective of the amount, it has been suggested that the card should be capable of being automatically read. This requires a card that is constructed for automatic reading and an inexpensive automatic reading system as a reader should be located at each point of sale to be easily accessible to each salesperson. Moreover, both the card and system should be essentially foolproof in operation and incapable of being unobservably altered. Each reader will accordingly produce an electrical representation that identifies the card and by a connection of the readers to a storage unit which could be a computer, supplies essentially instantaneously to the salesperson or others, information whether or not credit should be extended or the holder investigated.

Though some systems have heretofore been proposed to perform some or all of these acts automatically they have not been found completely satisfactory. One difficulty has been the cost of installing a reading system at each point of sale. Another difficulty has arisen by the requirement that the method of manufacturing cards be substantially altered which would increase the cost thereof in order to construct the card for an automatic reader. Still another difficulty has been to render the code on the card incapable of being altered either intentionally or unintentionally without it being humanly perceptible by a salesperson.

While reference has been made specifically to a credit card, the limitations on heretofore proposed systems for identification of documents are also present on other documents, such as checks, which require identification for validization and/or processing information related to the document.

Accordingly, it is an object of the present invention to provide a document and an automatic reading system therefor which obviates the above-noted difficulties.

Another object of the present invention is to provide a document and automatic reading system therefor which is extremely economical to manufacture and durable in use.

A further object of the present invention is to achieve the above objects and use a credit card in which automatically readable identifying indicia may be easily formed on the card without requiring any substantial changes in the present method of manufacturing the card or its appearance and which identifying indicia is essentially humanly undetectably unalterable.

Still another object of the present invention is to supply an automatic reading system using a code on a document that is essentially foolproof in operation thereby assuring that the card will be accurately read by a reading head.

In carrying out the present invention, there is provided a document which if a credit card is of essentially standard configuration on which the information that is desired to be automatically read is included. The card is formed by an intermediate sheet that has a top and bottom covering layer laminated thereto. On one of the surfaces of the intermediate sheet, at a selected location on the card with respect to an edge, there are located particles of magnetizable material. The particles are disposed in accordance with a code on the card so that the card, when passed beneath a magnetic reading head of an automatic reading system produces a voltage wave that is translated by the system into an electrical representation of the characters that the code represents.

In one embodiment of the invention blank credit cards may be formed in a conventional manner and then each blank card is individualized as desired by adding an automatically readable code, and other information which makes the card unique to the issuee.

In another embodiment of the invention the card is individualized prior to adding the top and bottom covering layers. In both instances, however, the code may contain any desired information such as the company's issuing number, the name of the issuee and/or other identifying information together with desired company information such as an expiration date. Moreover, in both embodiments the code is positioned on the card such that it is essentially non-alterable without mutilization of the card as it lies beneath one of the covering layers which must be altered and thus substantially minimizes any attempt to alter the code on the card without it being humanly perceptible.

The code is designed to be read by passing the card beneath a magnetic reading head which forms a voltage wave which is subsequently translated by the reading system into a binary representation of the coded information. The system and code are basically independent of the speed at which the card is moved beneath the magnetic reading head thereby obviating the necessity of having a card moving or transporting means which must have its speed precisely maintained. This is achieved in the present invention through the use of a code which cooperates with the automatic reading system such that the code itself provides to the reading system an indication of the various elements of each character which the code represents together with information of the completion of a character and the beginning of the next character. This enables the present system to use an extremely economical card transport device and code reading system thereby minimizing the cost for each installation.

The code consists of representing each character indicia or command by a set number of bars with the bars being of either a long extent or a short extent. For each character the bars are intermingled differently so that the system is capable of forming an electrical binary representation for each character. Each bar causes the storage of a binary state with the long bars effecting one state and the short bars the other, and after the set number of bars in the character the system effects a read out of the binary states and begins determining the next character. The read out may be utilized by any number of devices such as a computer which can provide an indication to the salesperson that credit should or should not be extended, a signal that the card has been reported stolen, or utilized in a billing system to which the amount of the sale may be added to the issuee's account, etc. Moreover, the coded information may be used instantaneously or, if desired, easily stored either in a binary form or as a voltage wave for subsequent utilization.

It will be understood that code may be imprinted as by a typewriter or other printing device on a document other than a credit card and that the system will operate to automatically identify or read the information so coded on the card in the same manner as it reads the information on a credit card.

Other features and advantages will hereinafter appear.

Referring to the drawing:

FIG. 5 is a diagrammatic representation of the electrical signal from a magnetic reading head when the coded portion of the card shown in FIG. 4 is passed therebeneath.

FIG. 6 is an enlarged view of a portion of the code shown in FIG. 1.

FIG. 7 is a chart of a code which is used in the present invention.

Figures 8, 9, 10, 11:
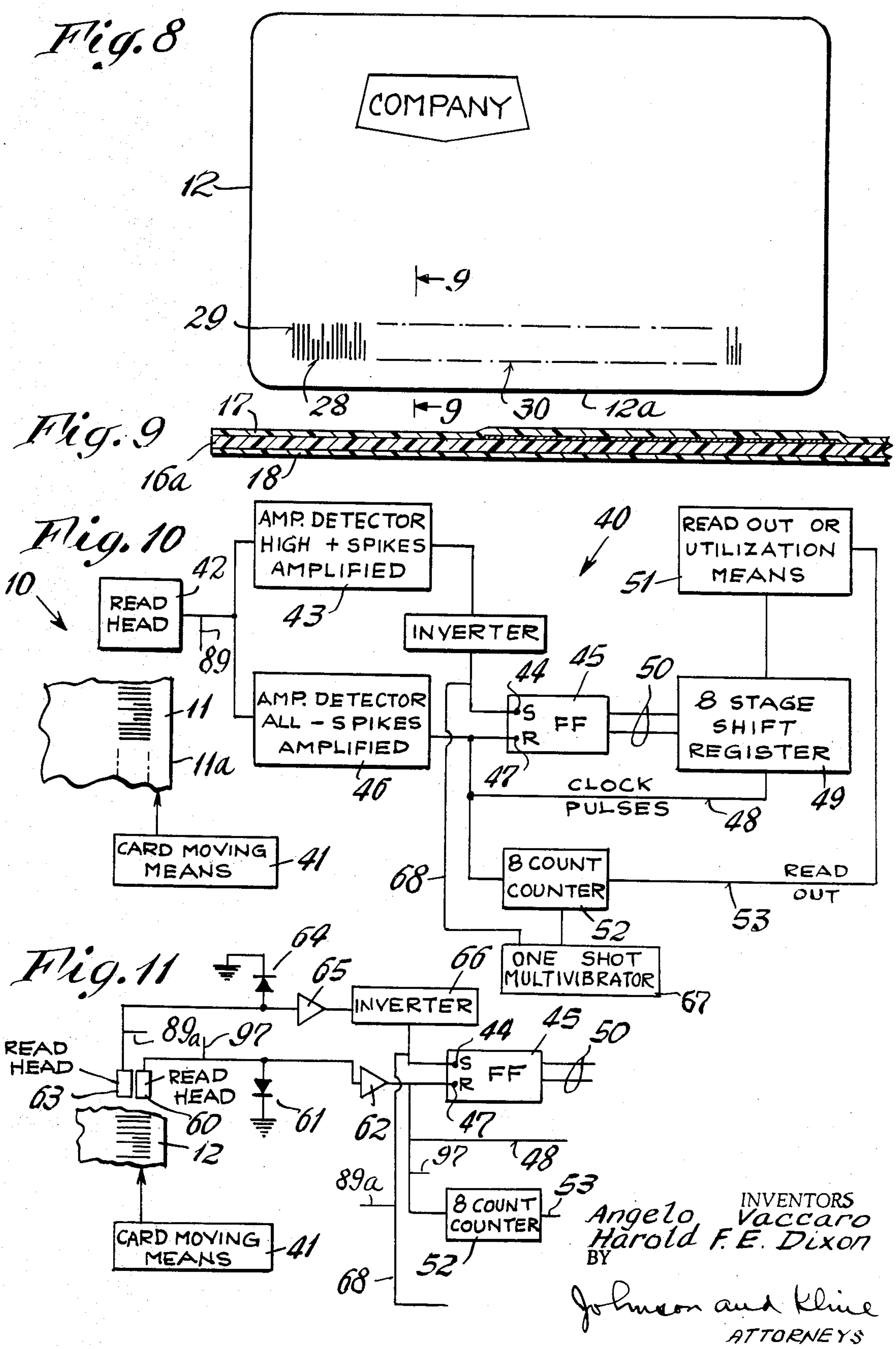
FIG. 8 is a view similar to FIG. 3 of the intermediate layer of the card with another embodiment of forming the coded information thereon.
FIG. 9 is an enlarged view of a section of a completed card using the intermediate layer shown in FIG. 8 on line 9—9.
FIG. 10 is a block and diagrammatic representation of one embodiment of an automatic reading system for reading the coded card shown in the prior figures.
FIG. 11 is another embodiment of an automatic reading system.

Referring to the drawing, the automatic reading system is generally indicated by the reference numeral 10 and is capable of automatically reading either a credit card 11 shown in FIGS. 1 through 4 or another embodiment of a credit card shown in FIGS. 8 and 9 and indicated by the reference numeral 12. In both embodiments of the credit card 11, they are of substantially rectangular configuration and have printing thereon which generally includes the name of the issuing company 13 and other information which the company may desire to impart to the issuee. Additionally, they are embossed with the name of the issuee 14 and an identifying number 15 assigned by the company to the issuee. The embossed characters 14 and 15 are generally used to effect imprinting on a form set of the embossed characters as is well known in the art at a point of sale location by a sales clerk.

Figure 2:
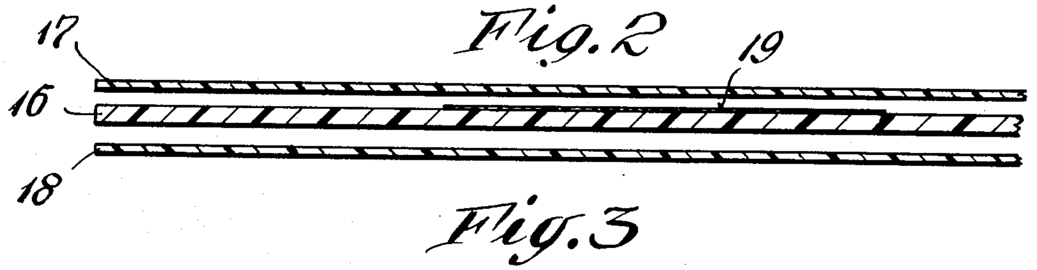
FIG. 2 is a sectional view somewhat enlarged of the components of the card taken along the line 2—2 of FIG. 1 prior to the assembly of the card.
Figure 3:
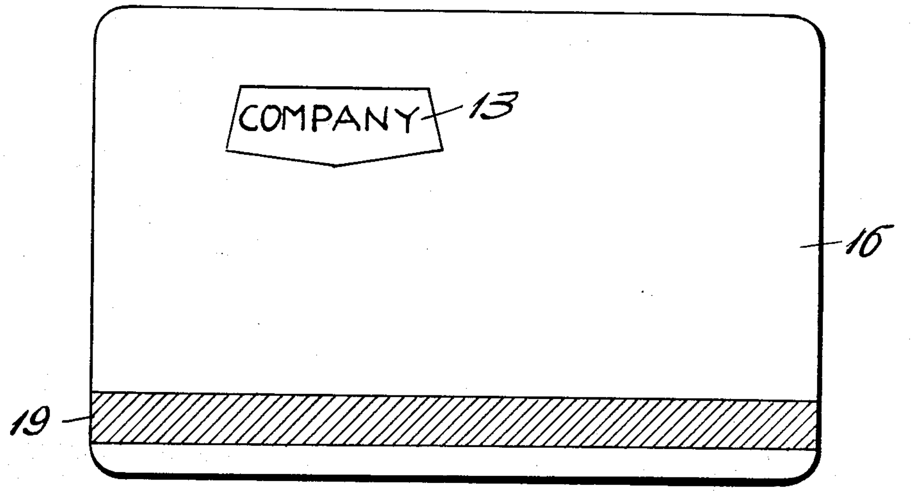
FIG. 3 is a view of the intermediate layer of the card.

One conventional method of forming the card 11 is indicated in FIG. 2 in which the card includes a relatively thick intermediate layer or sheet 16 formed of plastic together with top and bottom covering layers 17 and 18, respectively which are laminated to opposing sides of the intermediate sheet to form the unitary card. Normally the covering sheets 17 and 18 are transparent as the opposing surfaces of the intermediate sheet 16 has the desired printing thereon but they may be colored or imprinted if so desired. The two covering sheets 17 and 18 are relatively thin and serve to protect erosion of the printed material on the intermediate layer in addition to aiding in providing some stiffness or rigidity to the card.

After the intermediate sheet 16 has been printed, the two sheets 17 and 18 are laminated thereto to form a blank card and in a subsequent operation the embossed characters 14 and 15 are added. Thus one conventional method of forming the credit card is to form it as a blank having only printing and to then individualize the card to the issuee by embossing the characters 14 and 15 in a subsequent operation.

In accordance with the present invention, wherein in the embodiment of the credit card shown in FIGS. 1 through 4, it is desired to utilize this method of manufacture of first making blanks and then subsequently individualizing each card, the intermediate sheet has a thin layer of magnetizable material formed as a strip across a selected portion thereof with the layer being indicated by the reference numeral 19. The layer may be formed during the printing operation by in effect printing the layer 19 with magnetic ink which is rendered magnetic by the inclusion of magnetic particles such as iron oxide. The intermediate sheet may then be processed in the normal manner by the addition of the layers 17 and 18 to form a blank card.

To individualize a blank card with both embossed characters and indicia capable of being read by the automatic reading system, there is a code embossed onto the blank card where the strip of magnetic ink is printed. The code consists in the embodiment shown, of long bars 20 and short bars 21 that are arranged in a row along the strip 19 to have each bar extend transversely of the row. The particular disposition of the long and short bars, as will be more after fully set forth, determines the character which is individual to the card 11 and utilized to identify it. Thus, before, after or simultaneously with the embossing of the characters 14 and 15, the long and short bars of the code may be embossed onto the card along the strip 19 to form an automatically readable code.

Figure 4:
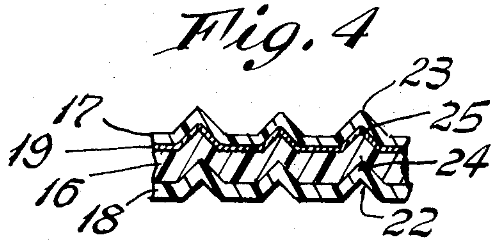
FIG. 4 is an enlarged section taken on line 4—4 of FIG. 1.

As shown in the enlarged view of FIG. 4, a long or short embossed bar will form an identation 22 on the bottom layer and a projection 23 on the top layer. This will also form an indentation 24 in the intermediate layer and which also displaces the magnetic strip 19 as indicated by reference numeral 25. When the card 11 is transported beneath a magnetic reading head, the indentation 25 will produce a voltage wave such as shown in FIG. 5 in which there is an initial positive spike 26 and a subsequent negative spike 27. The positive spike 26 is caused by the leading edge of indentation 25 increasing the flux carrying ability of the strip as it becomes closer to a reading head while the negative spike 27 is caused by the decrease in the flux as the trailing edge of the indentation recedes from the reading head. The voltage spikes 26 and 27 are for a long bar while a short bar by having less magnetic material will produce similar voltage spikes 26′ and 27′ but of a lesser amplitude. It will thus be understood that the voltage wave generated by passing the card 11 beneath a reading head will produce for each bar a positive and a negative spike with the speed of movement effecting difference in the length of time between spikes but not the relative amplitude of the spikes for the long and short bars.

In the embodiment of the credit card 12 shown in FIGS. 8 and 9, the same code is utilized to produce the same form of voltage wave. In the card 12, an intermediate sheet 16*a* is not only printed with the information which the company desires to impart to the issuee but in addition, coded information in the form of short bars and long bars 28 and 29, respectively, are also printed on the card. The bars 28 consist of small, parallelly aligned segments which are printed with ink having magnetic particles therein similar to the ink used to form the strip 19 and, if desired, may be printed simultaneously with other information.

After the printing of the intermediate sheet 16*a* of the credit card 12, the covering layers 17 and 18 are laminated thereto to produce the credit card, thereby causing the coded indicia to be beneath the layer 17. An enlarged section of the card taken through the portion containing the bars is shown in FIG. 9. As in the prior embodiment, the coded information is disposed beneath a covering layer. While the coded information is shown as being visible, it may, if desired, be printed with ink that is also used to form a printed design or overprinted by a design so that it is not visually perceptible.

In both embodiments of the credit cards 11 and 12 the code information consists of a plurality of aligned bars of short and long extent. The bars are parallelly positioned to extend in a row with one end of the bars being aligned along the row. Such an end is indicated by the reference numeral 30 and it is located a specific distance from an edge 11*a* or 12*a* of the card in order to correlate the location of the row with a definite part of the card.

Figure 1:
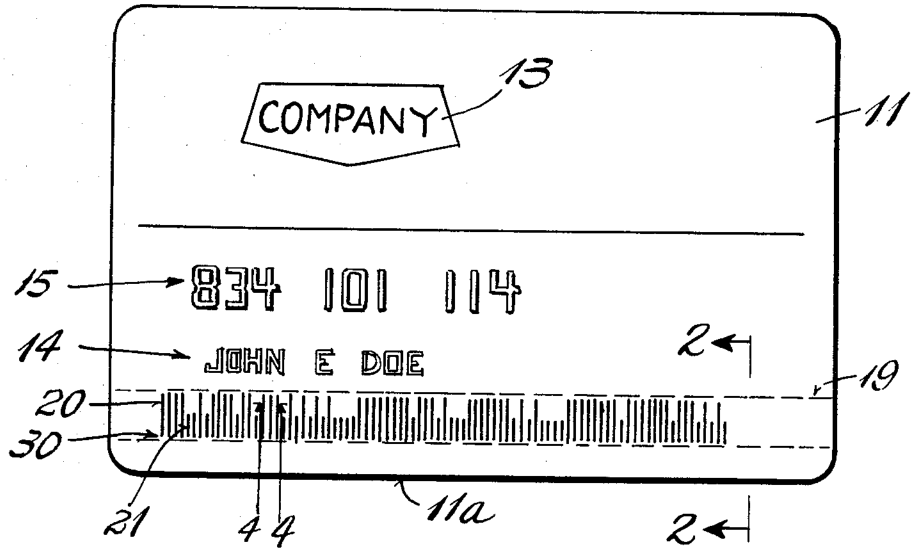
FIG. 1 is a plan view of a credit card made according to one embodiment for use with an automatic reading system of the present invention.

Shown in FIG. 7 is a chart showing the code for letters of the alphabet, numerals, punctuation and other indicia and operative commands. In this specific example of a code, each 1 indicates a long bar while each 0 indicates a short bar so that for the numeral 8, the code consists of four long bars followed by two short bars, a long bar and then a short bar. A specific representation thereof is shown in FIG. 6 and constitutes an enlarged representation of the first eight bars of the identifying number 15 on the card. The next character in the identifying number 15 is the numeral 3 as shown in FIGS. 1 and 6 and as indicated on the chart consists of four long bars, a short bar, two long bars and a short bar while the numeral 4 is identified in the code by three long bars, a short bar, a long bar, a short bar, a long bar and a short bar.

The code employs for each character eight bars so that there is the possibility of having $2^8$ or 256 different characters. However, in the code shown the first bar of each indicia is a long bar to constitute a trigger bar so that only seven of the eight bars are capable of being intermingled to form a code individual to each character. Moreover, this example code is similar to a teletype code employing lower case (L.C.) and upper case (U.C.) characters with the selection of lower case or upper case letters being made by use of a code command which for the lower case is indicated by the reference numeral 31 while the upper case is the code indicated by the reference numeral 32. When the lower case code appears in the row all subsequent indicia will be read at its lower case indicia until an upper case code appears after which all subsequent indicia will be read as upper case. Such a code is capable of being utilized in a teletypewriter for effecting a printing of the code by the teletypewriter if desired as one form of the utilization means.

While specific reference has been made to credit cards, it will be understood that a document, such as a piece of paper may also be capable of being automatically read by having the code formed thereon. One manner of forming the code could employ a typewriter having the striking heads made to print the bar code for the key depressed.

Referring to FIG. 10, there is shown one embodiment of an automatic reading system for reading a document 11 that is coded in accordance with the present invention. This system is generally indicated by the reference numeral 40 and a card 11 is shown positioned to be moved by a card moving means 41 past a magnetic read head 42. The voltage wave caused by each bar is passed through an amplifying detector 43 which amplifies only the high positive voltage spikes 26 with the amplified spikes then passing to a shift point 44 of a bistable flip-flop 45. Also connected to the read head to receive the voltage wave is another amplifying detector 46 which accepts only negative spikes 27 and amplifies each one and applies it to a reset terminal 47 of the flip-flop 45. In addition, the amplified negative spikes from the amplifying detector 46 are directed onto a lead 48 connected to an eight stage shift register 49. The lead 48 is connected to the shifting terminal of the register 49 and each voltage spike causes the shift register to increment its stages, thus they act as clock pulses for the shift register. The input or first stage of the register is connected by a pair of leads 50 to the sense points or output of the flip-flop 45.

In this system when a long bar is passed beneath the read head 42, the leading edge of the long bar will cause a high amplitude positive voltage spike 26 which will be amplified and passed to the shift terminal 44 of the flip-flop 45 causing it to assume the 1 state. The amplifying detector 46 rejects the positive spike. When the trailing edge of the long bar passes beneath the reading head, it produces a negative voltage spike 27 which is amplified by the amplifying detector 46 and applied to the reset terminal 47 of the flip-flop 45 which resets the state of the flip-flop to its 0 state. Simultaneously the amplified negative spike appears on the lead 48 to the shift register and causes it to increment one stage. However, as the input stage of the shift register is connected to the flip-flop 45 sense output by the leads 50, the initial stage will have achieved the same 1 state as the flip-flop 45 so that there will be stored in the second stage of the shift register after the shifting a binary state of 1.

When the read head encounters a short bar, the leading edge of the short bar will produce a positive voltage spike 26′ which is low in amplitude as compared to the higher positive voltage spike 26 produced by a long bar and accordingly it will not appear at the shift terminal of the flip-flop 45, which will thus maintain its 0 state. The trailing edge of the short bar produces a negative spike 27′ which will be amplified by the amplifying detector 46, applied to the reset terminal 47 where it will not affect the flip-flop 45 and also pass to the shift register 49 over the lead 48. This will cause the shift register to increment one stage and thus store in the second stage the 0 state of the flip-flop 45 while the 1 state will be in the third stage.

The system will continue reading each long and short bar, storing in the shift register 49 a 1 state for each long bar and a 0 state for each short bar until eight bars have been read, at which time the shift register will have each of its stages correspond to the code or binary representation for a character read as indicated in the chart FIG. 7. This binary information is transferred or read out from the shift register to a utilization means 51 by a command from a recirculating eight count counter 52 which also receives each of the amplified negative spikes from the amplitude detector 46 and upon achieving its eighth count while shifting to its zero count passes the command signal over a lead 53 to cause the read out or utilization means to accept the binary representation. The utilization means will then have stored within it the eight binary states of the shift register 49 which corresponds to the character read.

The system will then read the next eight bars which represent the next character and store the binary states corresponding to the bars in the shift register 49 with the eighth bar causing the counter 52 to again provide a command to read out the shift register information to the utilization means. The system will continue reading the bars and providing a read out command for each eight bars until the complete card has been moved by the moving means 41 beneath the reading head.

Shown in FIG. 11 is another embodiment of an automatic reading system in which two reading heads are employed instead of one. The prior system shown in FIG. 10 depended upon the amplitude of the spikes produced by the difference between the long and short bars to alter the state of the flip-flop 45. In this embodiment of the system two read heads are utilized with a first read head 60 being positioned adjacent the bottom edge 30 of the bars so that both long and short bars will pass therebeneath. The positive voltage spikes produced by the portions read by the head 60 are grounded by a network 61 with accordingly the negative voltage spikes only being amplified by an amplifier 62 and applied to the reset terminal 47 of the flip-flop 45. In addition, the amplified negative pulses are applied to the lead 48 and to the eight count counter 52. Another read head 63 is positioned with respect to the row of bars so that only a portion of the long bars will pass therebeneath. Each upper portion of a long bar will produce both positive and negative spikes but a grounding network 64 grounds the negative spikes of the voltage wave while an amplifier 65 will amplify the positive spikes. The amplified positive spikes are then inverted by an inverter 66 and applied to the shift terminal 44 of the flip-flop 45 where they function in the same manner as amplified spikes from the amplitude detector 43 to cause the flip-flop to achieve the 1 state and simultaneously shift the first stage of the shift register 49 to the 1 state.

In both embodiments of the automatic reading system each bar, whether long or short, causes incrementing of the shift register and also provides a determination after eight bars that read out of the storage in the shift register is to occur. In order to assure that the state of the flip-flop 45 will be in its 1 state when the negative spike of a long bar occurs, the present invention causes the state of the flip-flop to be responsive to the leading edge of a long bar while the shift register is responsive to the trailing edge of every bar. Thus, the system has the time required for a bar to pass beneath the read head to effect the shifting of the shift register 45 from its 0 state to its 1 state prior to the trailing edge of a bar resetting the flip-flop to its 0 state and also effecting the shifting of the shift register. In this manner the system is basically independent of the speed of movement of the card passing beneath the read head. The only limitation on the speed is that it be at least fast enough to generate spikes of sufficient amplitude to be detected by the amplifying detectors 43 and 46 to thereby set the low speed of movement while the high speed of movement is the responsiveness of the system to the spikes which is basically measured in micro seconds and thus will accommodate extremely fast speeds of the card.

The independence of the system from the speed of moving of the cards also provides a wide latitude in the dimensions of the bars and spaces. Conveniently the spaces between the bars may be essentially the same width as the bars but, if desired, they may be of a different width. Moreover, the bars may be of various widths. However, they must be of a minimum width which produces both positive and negative distinct spikes of sufficient amplitude to be utilized in the system. The quantity of magnetic particles in the bar is also an essentially non-critical factor but all the various factors must be arranged to produce spikes of sufficient amplitude and duration to be utilized by the system.

In both systems the counter 52 is set at zero when the row of coded information is to be read. To set the counter, there is provided a one shot multivibrator 67 which is connected to the counter to set it to a zero count whenever the multivibrator is energized. The multivibrator by the reading of a long bar is actuated through a lead 68 connected to the set terminal 49 of the flip-flop 45. The code for each character has a trigger bar or long bar as its initial bar and thus irrespective of which character is the first character of the coded information, the first bar read will always be a long bar. The time that the one shot multivibrator remains actuated is set for a time no less than the time required to read the coded information (tenths of a second) and no longer than the time between reading a first card and then a second card (perhaps 10 seconds). Thus the multivibrator will set the counter to zero with the first bar of the coded information as it is actuated, remaining actuated until all the coded information is read and then automatically shift to its rest position before the reading of the next card.

Figure 12:
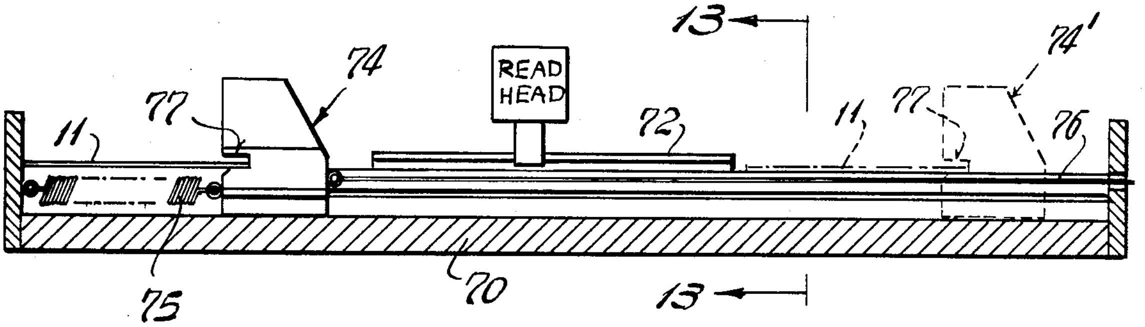
FIG. 12 is a diagrammatic view of one form of card moving or transporting means.
Figure 13:
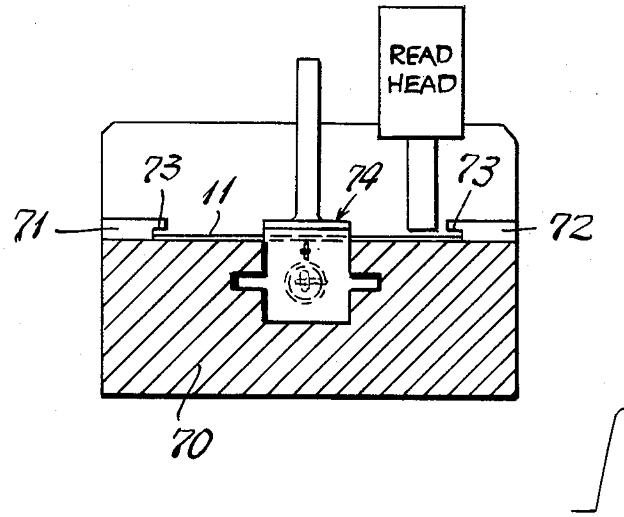
FIG. 13 is a section taken on the line 13—13 of FIG. 12, somewhat enlarged.

In view of the automatic reading system and code providing such a wide latitude of operation with respect to movement of the card past the read head, the present invention may employ any convenient, inexpensive and simple card moving means 41. One form of such a card transporting means is shown in FIGS. 12 and 13 and includes a base 70 having side flanges 71 and 72 that extend inwardly to form slots 73 which contain and guide opposing edges of a credit card. The intermediate portion of the base 70 is formed with a groove in which is positioned a shuttle 74 having one end attached to a spring 75 that has its other end secured to the base. A manually operable means such as a cord 76 or other easily grasped or manipulated device is secured to the shuttle for enabling it to be pulled rightwardly to cause an extension of the spring.

In use the shuttle 74 is moved to its dotted line position 74' by operation of the cord 76 and a credit card 11 or 12 is placed on the transport means such that the side flanges 71 and 72 engage the sides thereof while the card's end is engaged by a slot 77 formed in the shuttle. With the card 12 so positioned, the cord 76 is released which causes the spring 75 to contract, pulling the shuttle 74 to its solid line normal position and moving the credit card beneath the read head 42. Though other and different card moving means either manually or automatically actuated may be employed it will be understood that the present system does not require a card moving system that precisely controls the speed of movement of a card under the read head.

While one form of the utilization means has been indicated as being a computer, the present system also contemplates that an indicating device such as a light may be placed adjacent the card moving means and connected to the computer output to provide an essentially instantaneous signal to the sales clerk whether or not credit should be extended. Moreover, other information input devices may also provide information to the computer for use with the coded information, one example being the amount of the sale to enable automatic billing of the sale to the credit card that is read.

The specific embodiment of the code herein disclosed has long bars and short bars with the short bars being extended to form the long bars. It is to be understood, however, that the terms long bar and short bar are used to differentiate between the two bars and that the term is meant to include, unless otherwise expressly indicated, codes formed of two different elements with both elements producing the same trailing edge command but with the leading edge command being different. One different form of code contemplated is to form the long bar of two distinct portions that are separated transversely of the row of bars. Moreover, the number of bars for each character may be altered if desired without departing from the scope of the present invention.

The above systems include the utilization means with the coded information being directed thereto for essentially instantaneous use. The present invention is also usable when it is desired to store the coded information at the time of reading and subsequently employ the information with or without additional information derivable from another source but related to the coded information which identifies the card. One form of storing which may be extremely economical and effective to employ is the use of a magnetic tape on which the voltage wave may be recorded or as another embodiment the binary information in the coded information is recorded. The tape may then be read whenever its information is desired to be utilized.

Figure 14:
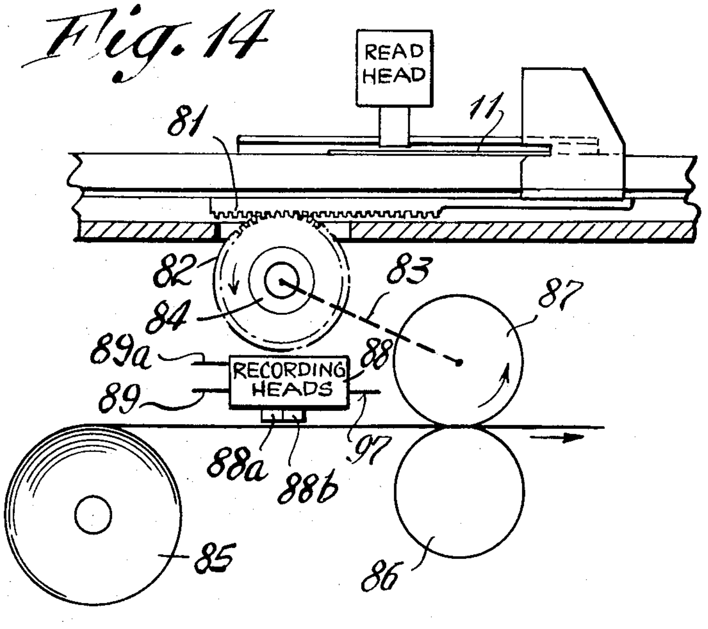
FIG. 14 is a diagrammatic view of another form of a card moving or transporting means in which the information may be stored.

Shown in FIG. 14 is an embodiment of the card transport means which is capable of recording the information obtained from reading the card onto a magnetic tape. The transport means is identical to that heretofore described except that the shuttle has secured thereto a rack 81 which mates with a gear 82. A shaft 83 is supported by the base for rotation and is secured to the inner periphery of a one way clutch 84. The gear 82 is secured to the outer periphery of the clutch. Accordingly, as the shuttle is moved leftwardly the shaft 83 will not rotate when the gear is rotated by the rack by reason of the one way clutch 84. However, when the shuttle is moved to its normal position carrying the document to be read beneath the read head 42, the shaft 83 is caused to rotate.

A length of magnetic recording tape 85 is supported as by a roller 86 and is oppositely engaged by a friction drive roller 87 that is secured to the shaft 83. A magnetic record head 88 is positioned above the tape and records the information received from a line 89. Thus the roller 87 will advance the tape 85 only when the gear 82 is rotated by the rack 81. The rack has at least the same length as the row of coded information and the roller 87 and gear 82 have approximately the same diameter so that the tape 85 is advanced at essentially the same speed as the document moves under the read head 42 and for the same distance. If desired, the information recorded on the tape 85 may be recorded on a greater or lesser distance and speed by varying the relative diameters of the roller and gear. Also the rack 81 may be of any desired length but must be at least the length of the coded information that is to be recorded.

Figure 15:
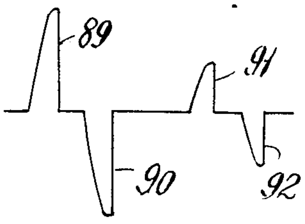
FIG. 15 is a wave shape which may be stored.

The information recorded on the tape may be derived from the read head 42 by the connection of the lead 89 thereto together with any necessary amplifiers. When the read head 42 is designed to read the coded information as spikes and is a single reading head and the recording head is a single track, then there will be magnetized on the tape 85 a voltage wave as shown in FIG. 15. The spike 89 represents the reading of a long bar leading edge, the spike 90 the long bar trailing edge, the spike 91, a short bar leading edge and the spike 92 a short bar trailing edge.

Figure 16:
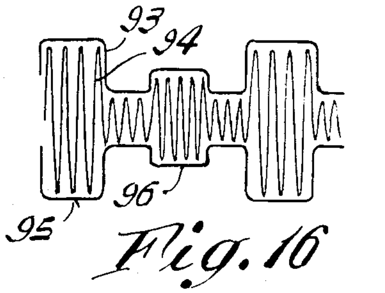
FIG. 16 is another embodiment of a wave shape which may be stored.

The above wave results from using a conventional permanent magnet type of magnetizer prior to the read head. If desired, an A.C. magnetizer may be employed to produce a wave such as shown in FIG. 16. Such a wave has the coded information superimposed as an envelope 93 on the A.C. frequency 94 which may be on the order of 10 K.C. The portions indicated by the reference character 95 represents long bars while the portion represented by the reference character 96 represents short bars. The information contained in this wave after recording on the tape may be subsequently decoded into long and short bar leading edge and trailing edge spikes as is well known in the art with the spikes being utilized as described in the above-noted systems.

It is also contemplated that for the system shown in FIG. 11 that the recording on the tape 85 constitutes a two track recording so that the recording head 88 will have a recording portion 88*a* and a recording portion 88*b*. The information to the portion 88*a* would be by a lead 89*a* connected to the output of the read head 63 while the information recorded by the recording portion 88*b* would be by a lead 97 connected to the head 60. For reading the tape, a dual read head would be employed such as the heads 60 and 63 with the information then being utilized in the system the same as if it resulted directly from the read heads 60 and 63.

While the above storage on tape records the voltage wave produced by reading the coded information, it is also contemplated that instead of the voltage wave that the binary representation of the coded information be recorded. This information would consist of the information effecting the state of the flip-flop 45. Accordingly, the lead 89*a* would be connected to the set terminal 44 of the flip-flop 45 while the lead 97 would be connected to the reset terminal. The tape 85 would then have recorded thereon by the recording head 88*a* on one track a spike for each time the leading edge of a long bar appeared in the coded information and a spike recorded by the recording head 88*b* on the other track for the trailing edge of every bar. Such a tape could then be read by a dual reading head and applied to the flip-flop 45 for subsequent utilization.

It is to be understood that the information received by the reading of the coded information may be instantaneously used in the utilization means, or conveniently recorded on a storage means for subsequent use in the reading system or both an instantaneous use and storage may be effected at the same time.

It will accordingly be appreciated that there has been disclosed a document which contains coded identifying indicia that is capable of being automatically read by an economical automatic reading system. The code comprises intermingled long and short bars of magnetic material that produce a voltage wave when the bars are passed beneath a magnetic reading head. The wave includes a leading edge voltage spike and a trailing edge voltage spike with the former effecting by its characteristic a binary representation of the bar and the latter producing the actuation pulses in the system. The system will thus produce a binary representation of each character which is utilizable to identify the document. Moreover, by the use of such a code and reading system an economical document transport means may be utilized and have incorporated therewith a recorder for recording the coded information for use later by the system or simultaneously therewith.

If the document is a credit card, other coded information may be applied to the card in a manner which protects alteration of the coded information on the card against accidental or intentional alteration by it being located within the card under a covering sheet.

Variations and modifications may be made within the scope of the claims and portions of the improvements may be used without others.

We claim:

1. An automatic identifying system for a credit card comprising the combination of a credit card and an automatic reading system therefor, said card including an intermediate sheet and top and bottom covering sheets coextensive therewith and secured to planar surfaces of the intermediate sheet, magnetic particles positioned on one surface of the intermediate sheet and disposed to form a code consisting of long and short bars with the bars being intermingled differently for each indicia and having spaces between the bars whereby each bar when passed beneath a magnetic reading head means produces a voltage wave having a leading edge voltage spike and a trailing edge voltage spike with the leading edge spike for the long bar being sensibly different from the leading edge spike for the short bar and in which said system includes magnetic reading head means, card transport means for moving the card relative to the head means to cause said bars to move relatively beneath the head means to provide the voltage wave, a shift register having a plurality of stages including an initial stage with the number of stages being at least equal to the number of bars representing the indicia, said shift register having means for incrementing its stages upon receipt of a clock pulse, means for directing the leading edge voltage spike of each bar to the initial stage to cause the initial stage to assume one state for a long bar spike and its other state for a short bar, means for directing the trailing edge voltage spike of every bar as a clock pulse to the shift register to effect incrementing of the shift register, and means for reading out the states of the stages of the shift register upon receipt of a number of trailing edge spikes which corresponds to the number of bars in the code representing the indicia.

2. An automatic reading system for providing an electrical representation of indicia formed on a document in which each indicia is identified by a code consisting of a set number of aligned bars with there being long bars and short bars and with the two bars being intermingled differently for each indicia and in which the bars are formed of magnetic particles comprising a magnetic reading head means, document transport means for moving the document relative to the head means to cause said bars to move relatively beneath the head means to provide a voltage wave which includes a leading edge voltage spike and a subsequent trailing edge voltage spike for each bar with the short bar leading edge spikes being different from the long bar leading edge spikes, storage means having a plurality of stages including an initial stage with the number of stages being at least equal to the number of bars representing each indicia, said storage means having means for incrementing its stages upon receipt of a clock pulse, means for directing the leading edge voltage spike of each bar to the initial stage to cause the initial stage to assume one state for a long bar spike and its other state for a short bar, means for directing the trailing edge voltage spike of every bar as a clock pulse to the storage means to effect incrementing thereof and means for reading out the states of the stages of the storage means upon receipt of a number of trailing edge spikes which corresponds to the number of bars in the code representing the indicia, in which the document has an edge, in which the bars are parallelly aligned and positioned to form a row parallel to the edge, in which the document transport means has a guide changeable with the edge in which the reading means is located with respect to the guide to overlie the row as the edge engages the guide and in which the document transport means includes a shuttle mounted for movement in alignment with the guide, means for urging the shuttle to a normal position on one side of the reading means and manually operable means for displacing the shuttle away from its normal position to the other side of the reading means whereby said shuttle may engage the document and move it from its displaced position to its normal position to cause the document to pass beneath the reading means.

3. An automatic reading system for providing an electrical representation of indicia formed on a document in which each indicia is identified by a code consisting of a set number of aligned bars with there being long bars and short bars and with the two bars being intermingled differently for each indicia and in which the bars are formed of magnetic particles comprising a magnetic reading head means, document transport means for moving the document relative to the head means to cause said bars to move relatively beneath the head means to provide a voltage wave which includes a leading edge voltage spike and a subsequent trailing edge voltage spike for each bar with the short bar leading edge spikes being different from the long bar leading edge spikes, storage means having a plurality of stages including an initial stage with the number of stages being at least equal to the number of bars representing each indicia, said storage means having means for incrementing its stages upon receipt of a clock pulse, means for directing the leading edge voltage spike of each bar to the initial stage to cause the initial stage to assume one state for a long bar spike and its other state for a short bar, means for directing the trailing edge voltage spike of every bar as a clock pulse to the storage means to effect incrementing thereof and means for reading out the states of the stages of the storage means upon receipt of a number of trailing edge spikes which corresponds to the number of bars in the code representing the indicia in which the system includes record means for storing an electrical reproduction of the character read, means for operating the record means while the coded information on the document is being read and means for subsequently utilizing the record means in the system to produce the electrical representation of the coded information and in which the record means includes a length of magnetizable tape and a recording head and in which the operating means moves the tape relative to the recording head simultaneously with the movement of the document beneath the reading head means.

4. The invention as defined in claim 3 in which document transport means includes a movable member for moving the document, in which the operating means includes a movable member for moving the tape and in which there are means interconnecting the movable members to cause them to move in unison.

5. The invention as defined in claim 4 in which the movable member of the document transport means moves between a normal position and a manually displaced position with the positions being on opposite sides of the reading means and in which the interconnecting means includes one-way means for operating both movable members in unison when the document transport means movable member is only moving from the manually displaced position to the normal position.

6. An automatic reading system for providing an electrical representation of indicia formed on a document in which each indicia is identified by a code consisting of a set number of aligned bars with there being long bars and short bars and with the two bars being intermingled differently for each indicia and in which the bars are formed of magnetic particles comprising a magnetic reading head means, document transport means for moving the document relative to the head means to cause said bars to move relatively beneath the head means to provide a voltage wave which includes a leading edge voltage spike and a subsequent trailing edge voltage spike for each bar with the short bar leading edge spikes being different from the long bar leading edge spikes, storage means having a plurality of stages including an initial stage with the number of stages being at least equal to the number of bars representing each indicia, said storage means having means for incrementing its stages upon receipt of a clock pulse, means for directing the leading edge voltage spike of each bar to the initial stage to cause the initial stage to assume one state for a long bar spike and its other state for a short bar, means for directing the trailing edge voltage spike of every bar as a clock pulse to the storage means to effect incrementing thereof and means for reading out the states of the stages of the storage means upon receipt of a number of trailing edge spikes which corresponds to the number of bars in the code representing the indicia, in which the system includes record means for storing an electrical reproduction of the character read, means for operating the record means while the coded information on the document is being read, means for subsequently utilizing the record means in the system to produce the electrical representation of the coded information, in which the record means includes an input in which the input is connected to an output of the magnetic reading head means whereby the electrical representation stored is the voltage wave produced by the coded information, in which there is one magnetic reading head means and in which the record means includes only one record head to thereby record the electrical reproduction on one track on the magnetic tape.

7. The invention as defined in claim 6 in which the input of one record head is connected to record the state of the initial stage of the storage means and in which the other record head is connected to record the clock pulses to the storage means.

8. An automatic reading system for providing an electrical representation of indicia formed on a document in which each indicia is identified by a code consisting of a set number of aligned bars with there being long bars and short bars and with the two bars being intermingled differently for each indicia and in which the bars are formed of magnetic particles comprising a magnetic reading head means, document transport means for moving the document relative to the head means to cause said bars to move relatively beneath the head means to provide a voltage wave which includes a leading edge voltage spike and a subsequent trailing edge voltage spike for each bar with the short bar leading edge spikes being different from the long bar leading edge spikes, storage means having a plurality of stages including an initial stage with the number of stages being at least equal to the number of bars representing each indicia, said storage means having means for incrementing its stages upon receipt of a clock pulse, means for directing the leading edge voltage spike of each bar to the initial stage to cause the initial stage to assume one state for a long bar spike and its other state for a short bar, means for directing the trailing edge voltage spike of every bar as a clock pulse to the storage means to effect incrementing thereof and means for reading out the states of the stages of the storage means upon receipt of a number of trailing edge spikes which corresponds to the number of bars in the code representing the indicia in which the system includes record means for storing an electrical reproduction of the character read, means for operating the record means while the coded information on the document is being read, means for subsequently utilizing the record means in the system to produce the electrical representation of the coded information in which the record means includes two record heads with each having an independent input and means for connecting each input to a different part of the system to cause recording of the electrical reproduction of the coded information on two separate tracks on the magnetic tape.

9. The invention as defined in claim 8 in which the magnetic reading head means includes two separate reading heads, in which each reading head reads a different portion of the coded information and in which the input of one record head is connected to one reading head and the input of the other record head is connected to the other reading head whereby the electrical reproduction is the voltage wave from each reading head with each record head recording on a separate track on the magnetic tape.

10. An automatic reading system for providing an electrical representation of indicia formed on a document in which each indicia is identified by a code consisting of a set number of aligned bars with there being long bars and short bars and with the two bars being intermingled differently for each indicia and in which the bars are formed of magnetic particles comprising a magnetic reading head means, document transport means for moving the document relative to the head means to cause said bars to move relatively beneath the head means to provide a voltage wave which includes a leading edge voltage spike and a subsequent trailing edge voltage spike for each bar with the short bar leading edge spikes being different from the long bar leading edge spikes, storage means having a plurality of stages including an initial stage with the number of stages being at least equal to the number of bars representing each indicia, said storage means having means for incrementing its stages upon receipt of a clock pulse, means for directing the leading edge voltage spike of each bar to the initial stage to cause the initial stage to assume one stage for a long bar spike and its other state for a short bar, means for directing the trailing edge voltage spike of every bar as a clock pulse to the storage means to effect incrementing thereof and means for reading out the states of the stages of the storage means upon receipt of a number of trailing edge spikes which corresponds to the number of bars in the code representing the indicia in which the means for reading out the states of the stages includes a counter connected to receive each trailing edge spike and to count each trailing edge spike, in which the counter has a maximum count equal to the number of bars in the code for each indicia and in which there are means for setting the counter to a zero count for each document.

11. A document having magnetically sensible indicia that is readable by an automatic reading system having a magnetic reading head, magnetic particles positioned on one surface of the document and disposed to form a code consisting of long and short bars with the bars being intermingled differently for each indicia and having spaces between the bars whereby each bar when passed beneath a magnetic reading head means produces a voltage wave having a leading edge voltage spike and a trailing edge voltage spike with the leading edge spike for the long bar being sensibly different from the leading edge spike for the short bar in which the document is a credit card having an intermediate sheet and top and bottom covering sheets coextensive therewith and secured to planar surfaces of the intermediate sheet in which the intermediate sheet is formed with a continuous strip of magnetic particles and in which the bars are embossed in the card to physically displace the strip where the bars are formed.

* * * * *